US008898150B1

(12) United States Patent
Kuramochi et al.

(10) Patent No.: US 8,898,150 B1
(45) Date of Patent: Nov. 25, 2014

(54) COLLECTING IMAGE SEARCH EVENT INFORMATION

(75) Inventors: Michihiro Kuramochi, Palo Alto, CA (US); James M. Synge, Lexington, MA (US); Zhongli Ding, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/608,278

(22) Filed: Sep. 10, 2012

(51) Int. Cl.
*G06F 7/00* (2006.01)
*G06F 17/30* (2006.01)

(52) U.S. Cl.
USPC .......................................... 707/722; 707/724

(58) Field of Classification Search
None
See application file for complete search history.

(56) References Cited

U.S. PATENT DOCUMENTS

| | | | |
|---|---|---|---|
| 2004/0049486 A1* | 3/2004 | Scanlon et al. ................ 707/1 |
| 2006/0227992 A1* | 10/2006 | Rathus et al. ................ 382/100 |
| 2007/0172155 A1* | 7/2007 | Guckenberger ............... 382/305 |
| 2007/0180355 A1* | 8/2007 | McCall et al. ............. 715/501.1 |
| 2010/0067809 A1* | 3/2010 | Kawata et al. ................ 382/224 |
| 2011/0219025 A1* | 9/2011 | Lipson et al. ................. 707/769 |
| 2011/0282906 A1* | 11/2011 | Wong ............................ 707/780 |
| 2011/0295879 A1* | 12/2011 | Logis et al. ................... 707/769 |
| 2012/0011148 A1* | 1/2012 | Rathus et al. ................. 707/769 |

* cited by examiner

*Primary Examiner* — Tony Mahmoudi
*Assistant Examiner* — Tuan A Pham
(74) *Attorney, Agent, or Firm* — Fish & Richardson P.C.

(57) ABSTRACT

Methods, systems, and apparatus, including computer programs encoded on a computer storage medium, for collecting and compiling information regarding search operations. In one aspect, a query log that stores search event data items for identifiers is accessed. A proper subset of the search event data items is identified, the proper subset of search event data items being search event data items for search events related to an image search. A proper subset of the identifiers is identified, the proper subset of identifiers being identifiers associated with a search event data item for a search event related to an image search. For each identifier of the proper subset of identifiers, an image search session data object is generated using the proper subset of search event data items.

27 Claims, 9 Drawing Sheets

COLLECTING IMAGE SEARCH EVENT INFORMATION

BACKGROUND

This specification relates to collecting and compiling information regarding search operations.

The Internet provides access to a wide variety of resources such as image files, audio files, video files, and web pages. A search system can identify resources in response to a text query that includes one or more search terms or phrases. The search system ranks the resources based on their relevance to the query and on measures of quality of the resources and provides search results that link to the identified resources. The search results are typically ordered for viewing according to the rank.

The search system may also rank resources based on the performance of the resource with respect to the particular query. For example, some conventional search systems rank resources having a high click-through rate for the particular query higher than resources having a lower click-through rate for the particular query. The general assumption under such an approach is that queries are often an incomplete expression of the information needed, and the user's action of selecting a particular resource is a signal that the resource is at least as responsive to, or more responsive to, the user's informational need that the other identified resources.

To determine the performance of a resource with respect to particular queries, information regarding the particular query, the resources, and user actions is collected. However, some search results facilitate other user interactions in addition to the selection of an identified resource. Given the vast amount of user interaction data that can be collected, and the noise that is inherent in the data, it is difficult to collect this information in a meaningful form for processing.

SUMMARY

This specification describes technologies relating to collecting and compiling information regarding search operations.

In general, one innovative aspect of the subject matter described in this specification can be embodied in methods that include the actions of accessing a query log that stores search event data items for identifiers, each search event data item including: information regarding a search event, a time stamp specifying a time and date at which the search event occurred; and an identifier associated with the search event; identifying a proper subset of the search event data items, the proper subset of search event data items being search event data items for search events related to an image search; identifying a proper subset of the plurality of identifiers, the proper subset of identifiers being identifiers associated with at least one search event data item for a search event related to an image search; and generating, for each identifier of the proper subset of identifiers, at least one image search session data object using the proper subset of search event data items, each image search session data object being for a particular time period and including information regarding image search events derived from the proper subset of search event data items that include the identifier and that occurred during the time period. Other embodiments of this aspect include corresponding systems, apparatus, and computer programs, configured to perform the actions of the methods, encoded on computer storage devices.

These and other embodiments can each optionally include one or more of the following features. Each search event can include at least one of receiving a search query, providing search results in response to a search query, receiving information identifying an interaction with a search result provided in response to a search query, and receiving information identifying an interaction with a web browser window presenting search result provided in response to a search query. The information identifying an interaction with a search result provided in response to a search query can include one of information identifying a selection of a search result and information identifying a hover over a search result by a pointer element. The information identifying the interaction with the search result further can include a time duration value specifying a time duration of the interaction.

Each image search session data object for an identifier can include a time ordered list of query data items. Each query data item can be for a particular search query received from a device associated with the identifier and can include information identifying the received search query and information identifying search results provided in the response to the received search query.

Generating an image search session data object for an identifier can include: identifying each search event data item of the proper subset of search event data items that is associated with the identifier and further associated with an particular search query; extracting information from each identified search event data item; and generating a query data item for the particular search query using the extracted information.

Generating an image search session data object for an identifier further can include: determining whether an identified search event data item includes information identifying an interaction with a search result provided in response to receiving the particular search query; and creating an interaction data item as part of the query data item. The interaction data item can identify the search result receiving the interaction.

The interaction data item can include information identifying a type of interaction, the type of interaction being one of a selection of the search result and a hover of a pointer element over the search result. The interaction data item can include a location within a viewport of the search result receiving the interaction. The interaction data item can include a time stamp specifying a time and date at which the interaction began.

Each query data item can include information identifying a viewport location for each provided search result. The viewport location defining a presentation location of the search result within a viewport.

Each query data item can include a location value for each provided search result. The location value can specify a page number, column number, and row number for which the provided search result is presented. Each query data item can include, for each search result provided in response to the search query of the query data item, information specifying whether the search result was presented to a user. The information specifying whether a search result was presented to a user can be determined based on a viewport location for the search result and whether that viewport location was presented to the user.

Each query data item comprises location information specifying a location of a pointer element when the search results were initially provided in response to the query.

Aspects can further include: identifying, using image search session data objects for the identifiers, each unique search query represented in the image search session data objects; identifying, for each unique query, each query data item associated with the unique query; and generating a query record for each identified search query, the query record including information extracted from each query data item associated with the identified search query.

Particular embodiments of the subject matter described in this specification can be implemented so as to realize one or more of the following advantages. Information stored in query logs can be parsed to identify search events directed to an image search to facilitate the processing of search information for image search operations. Information regarding searches directed to images can be compiled into image session objects that each store a time ordered sequence of image search events associated with an identifier, thus providing image-search relevant data in a compact form to facilitate further processing. The information can include information describing user interactions with search results and user interfaces that present the search results to facilitate analysis of user interactions in the context of a two-dimensional display of image search results. For example, the user interaction information can include information regarding a pointer element hovering over a search result and a time duration value specifying an amount of time the image was hovered. Analysis of the time durations can identify false-positive interactions, such as hovers that result of a movement of a cursor across. This information can be aggregated over a multitude of users and analyzed to improve the information provided by search results.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

§1.0 Overview

Figure 1:
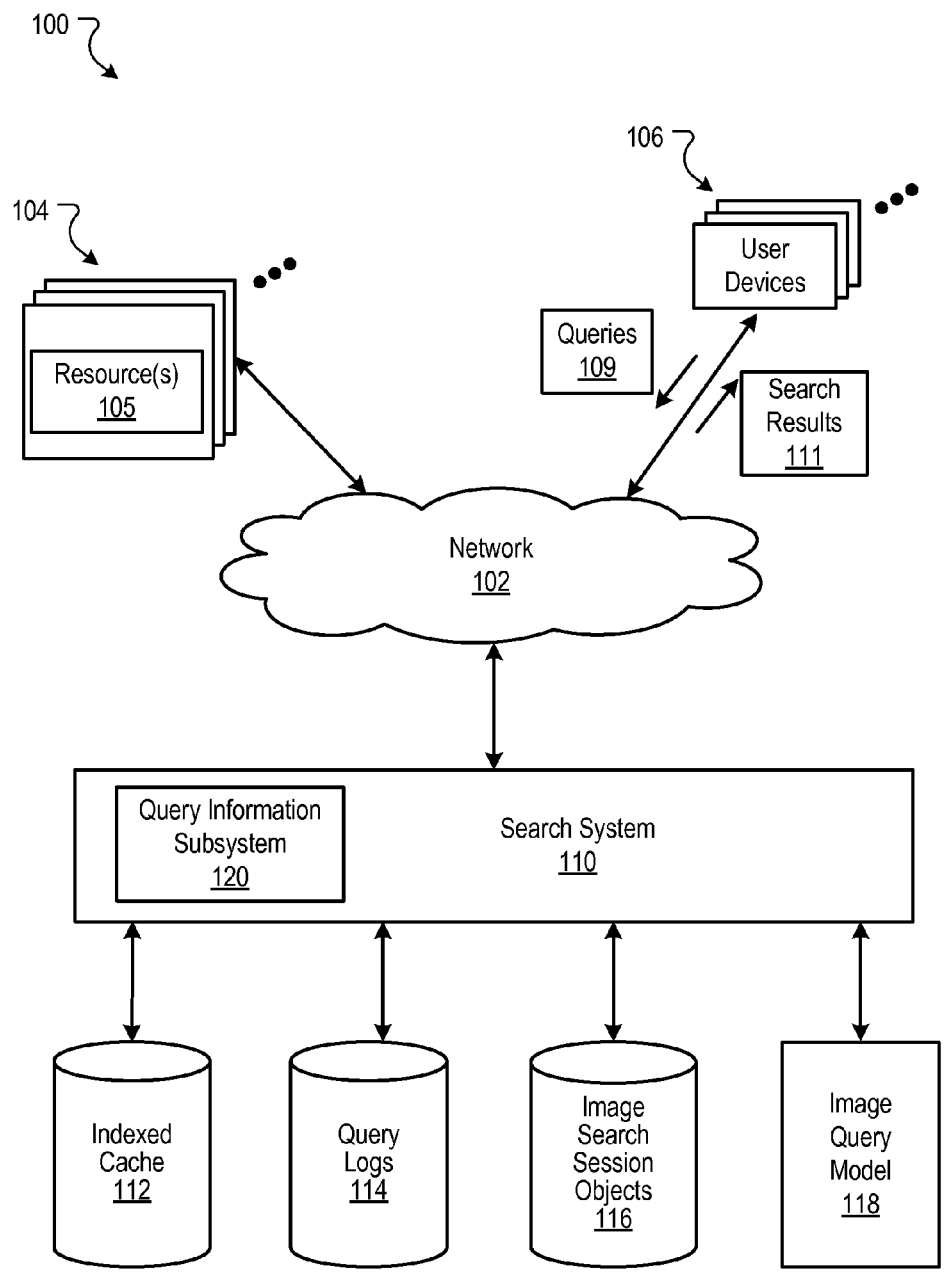
FIG. 1 is a block diagram of an example environment in which a search system provides search operations and collects information regarding search operations.

In general, the subject matter of this specification relates to collecting information regarding search operations and compiling the collected information into a data structure to represent users' search activities in a compact form. Information regarding search events handled by a search system is stored in a query log. As used in this specification, a search event is data and actions related to a search operation. For example, a search event handled by the search system may be receiving a query, the query itself, providing search results responsive to a received query, a search result, or a user interaction with a search result or a user interface (e.g., viewport or web browser window) presenting search results.

The query log can store information regarding search events handled by the search system that are associated with search queries received from many different client devices. This information can include information identifying received queries, the time at which search events occur, information identifying search results provided responsive to received search queries, and information regarding interactions with search results and/or search interfaces. The search event information may also include information identifying a type of search operation for which the search event is associated. For example, a search system may be capable of processing search queries for general content, images, videos, news articles, maps, or other specific types of content. The search event information stored in the query log can also include an identifier that can uniquely associate search events with other search events. For example, the identifier may be an anonymized user identifier that identifies a user or a user device associated with the search event.

As the query log may include a vast amount of search event information, it can be beneficial for the search system to extract relevant data and put the data into a more meaningful form for processing. In order to process the data for image search events, for example, for use in an image ranking process, the search system generates image search session data objects that each include information regarding image search events using data stored in the query log. An image search session data object can include information regarding image search events associated with an identifier and occurring during a predefined time period. For example, an example image search session data object may include, for an identifier, information regarding image search events associated with the identifier that occurred over a twenty-four hour period. Other time periods, such as one week, one month, and one year may also be used. The data stored in an image session data object may include data that identifies, for each search query for which image search results have been provided, each image search result that was presented, a location in the viewport that each image search result was presented (e.g., column and row or position in an array), which image search results received an interaction (e.g., click or hover), and/or an order in which the image search results received interactions. In some implementations, the image search session data objects include a time-ordered sequence of image search events for an identifier. In some implementations, the image search session data objects include, for each received search query in the image search session data object, a two dimensional layout (e.g., row and column) identifying the presentation of the image search results to the user.

The search system processes the image search session data objects for multiple identifiers to generate one or more image query models. In general, an image query model includes data regarding image search events aggregated over multiple users. In some implementations, an image query model is a quasi-two dimensional model having information regarding image search results provided for a particular search query, or multiple search queries. For example, a quasi-two dimensional model for a particular search query may include data identifying each image search result provided for the particular search query, how many interactions (e.g., hover count and/or selection count) each provided image search result received, and data specifying the viewport position at which each image search result was presented. The image query model(s) can be processed to facilitate other search operations, such as relevance scoring, search result boosting or demoting, and the like.

§1.1 Example Operating Environment

FIG. 1 is a block diagram of an example environment 100 in which a search system 110 provides search operations and collects information regarding search operations. A computer network 102, such as a local area network (LAN), wide area network (WAN), the Internet, a mobile phone network, or a combination thereof, connects web sites 104, user devices 106, and the search system 110. The environment 100 may include many thousands of web sites 104 and user devices 106.

A web site 104 is one or more resources 105 associated with a domain name and hosted by one or more servers. An example web site 104 is a collection of web pages formatted in hypertext markup language (HTML) that can contain text, images, multimedia content, and programming elements, such as scripts. Each web site 104 is maintained by a publisher (e.g., an entity that manages and/or owns the web site).

A resource 105 is any data that can be provided by a web site 104 over the network 102 and that is associated with a resource address. Resources 105 include HTML pages, word processing documents, portable format (PDF) documents, images, video, and feed sources, to name just a few. The resources 105 can include content, such as words, phrases, images, and sound, and may include embedded information (e.g., meta information and hyperlinks) and/or embedded instructions (e.g., scripts).

A user device 106 is an electronic device that is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

§1.2 Search Processing

To facilitate searching of resources 105, the search system 110 identifies the resources 105 by crawling and indexing the resources 105 provided on web sites 104. Data about the resources 105 can be indexed based on the resource 105 to which the data corresponds. The indexed and, optionally, cached copies of the resources 105 are stored in an indexed cache 112.

A user device, such as user device 106, can submit a search query 109 to the search system 110. The search system 110 performs a search operation that uses the search query 109 as input to identify resources 105 responsive to the search query 109. For example, the search system 110 may access the indexed cache 112 to identify resources 105 that are relevant to the search query 109. The search system 110 identifies the resources 105, generates search results 111 that identify the resources 105, and returns the search results 111 to the user devices 106.

The search query 109 can include one or more search terms. A search term can, for example, include a keyword submitted as part of a search query 109 to the search system 110 that is used to retrieve responsive search results 111. In some implementations, the search query 109 includes an image.

A search result 111 is data generated by the search system 110 that identifies a resource 105 that is responsive to a particular search query 109, and includes a link to the resource 105. An example search result 111 can include a web page title, a snippet of text or an image or portion thereof extracted from the web page, and a hypertext link (e.g., a uniform resource locator (URL)) to the web page.

The search terms in the search query 109 control the search results 111 that are identified by the search system 110. Although the actual ranking of the search results 111 varies based on the ranking algorithm used by the search system 110, the search system 110 can retrieve and rank search results 111 based on the search terms submitted through a search query 109.

For a search directed to images that uses a text query as input, the search system 110 can combine the relevance score of a resource 105 with a relevance feedback score of an image embedded in the resource 105. These combined scores are then used to present search results 111 directed to the images embedded in the resources 105.

The relevance scores for an image can be based on labels that are associated with the image. Labels are text or data flags that indicate a topic to which the image belongs. Labels can be explicitly associated with an image, for example, by the publisher that is providing the image. For example, a publisher can associate the text "football" with an image that includes content that is directed to football (e.g., an image of a football or a football player). Labels can also be explicitly associated with an image by users to whom the image is presented.

In general, the relevance feedback score for an image with respect to a search query is a score derived from data specifying interactions received for the image when that image is referenced in a search result 111 for a search query 109. In some implementations, the relevance feedback score for an image is based on a click-through rate for the image with respect to the search query. In some implementations, the relevance feedback score for an image with respect to a search query is based on hovers over the image when the image is referenced in search results for the search query.

§2.0 Query Information Subsystem

Image search results are often provided as thumbnail images that are reduced-size versions of the original images, i.e., the images they represent and that are hosted on a web site 104. For example, the search system 110 may identify images that are relevant to a search query 109 received from a user device 106 and provide thumbnail versions of the identified images as search results 111 to the user device 106. The images may be presented according to the rank of the images with respect to the received search query 109. For example, the images may be presented along rows and columns of a web browser window according to the ranking. The images also may be split between multiple pages of search results 111 according to the ranking.

A larger version of an image provided as a search result 111 may be presented to a user in response to the user hovering a pointer element over the image, for example for at least a threshold amount of time. One example pointer element includes a cursor controlled by a mouse, touchpad, or other selection device. Another example pointer element includes a selection device, such as a finger or stylus, for selecting content displayed by a touch screen display. The user device 106 may detect a hover over an image and, in response, present a larger version of the hovered image to the user. The larger version of the image may be provided to the user device 106 along with the search results 109 or in response to the user device 106 detecting the hovering and requesting the larger version of the image from the search system 110. Typically, however, the larger version that is provided is separate from the image that the search result references, e.g., the hovering over the image does not, in some implementations, result in an HTTP request for the image to the web site that hosts the image.

In implementations described in this application, image hover data can be used, in part, to rank images. For example, the search system 110 can consider the hovers as selections in a click-through rate calculation of the relevance feedback score. For instance, images that are often hovered over when provided as a search result 111 may be ranked higher than images that are infrequently hovered over or selected. The general assumption under such an approach is that searching users will hover over images that are of interest to the user to determine whether to request a larger version of the image.

Some short hovers may be incidental, for example a cursor moving over an image en route to another image. Accordingly, in some implementations, the duration of a hover may also be considered in an image ranking process. In some implementations, hovers that have received a duration less than a threshold period of time may be filtered from image search session data objects and/or image query models, as the hovers may be considered incidental rather than a sign of interest in the images referenced by the hovered image search results. For example, a user may navigate a pointer (e.g., cursor) quickly over several image search results on a path to an image search result if interest to the user.

The search system 110 includes a query information subsystem 120 that, among other things, collects and compiles information regarding image searches and optionally, other types of searches. This information includes information regarding hovers and selections of images provided as search results 111 in response to search queries 109. The query information subsystem 110 compiles the information so that the information can be evaluated and used to improve the ranking of images for search queries 109.

The query information subsystem 120 stores data regarding search events associated with one or more identifiers in query logs 114. The search events logged in the query logs 114 include receiving a search query 109 at the search system 110, providing search results 111 in response to a received search query 109, user interactions with a search result 111 or a user interface presenting search results 111, and respective times and/or durations of each event, if applicable. Other types of search events typically handled by a search system 110 can also be logged in the query logs 114.

In some implementations, data regarding search events handled by the search system 110 are stored in search event data items. Each search event data item can include data regarding a specific search event, such as receipt of a search query or an interaction with a search results.

Figure 7:
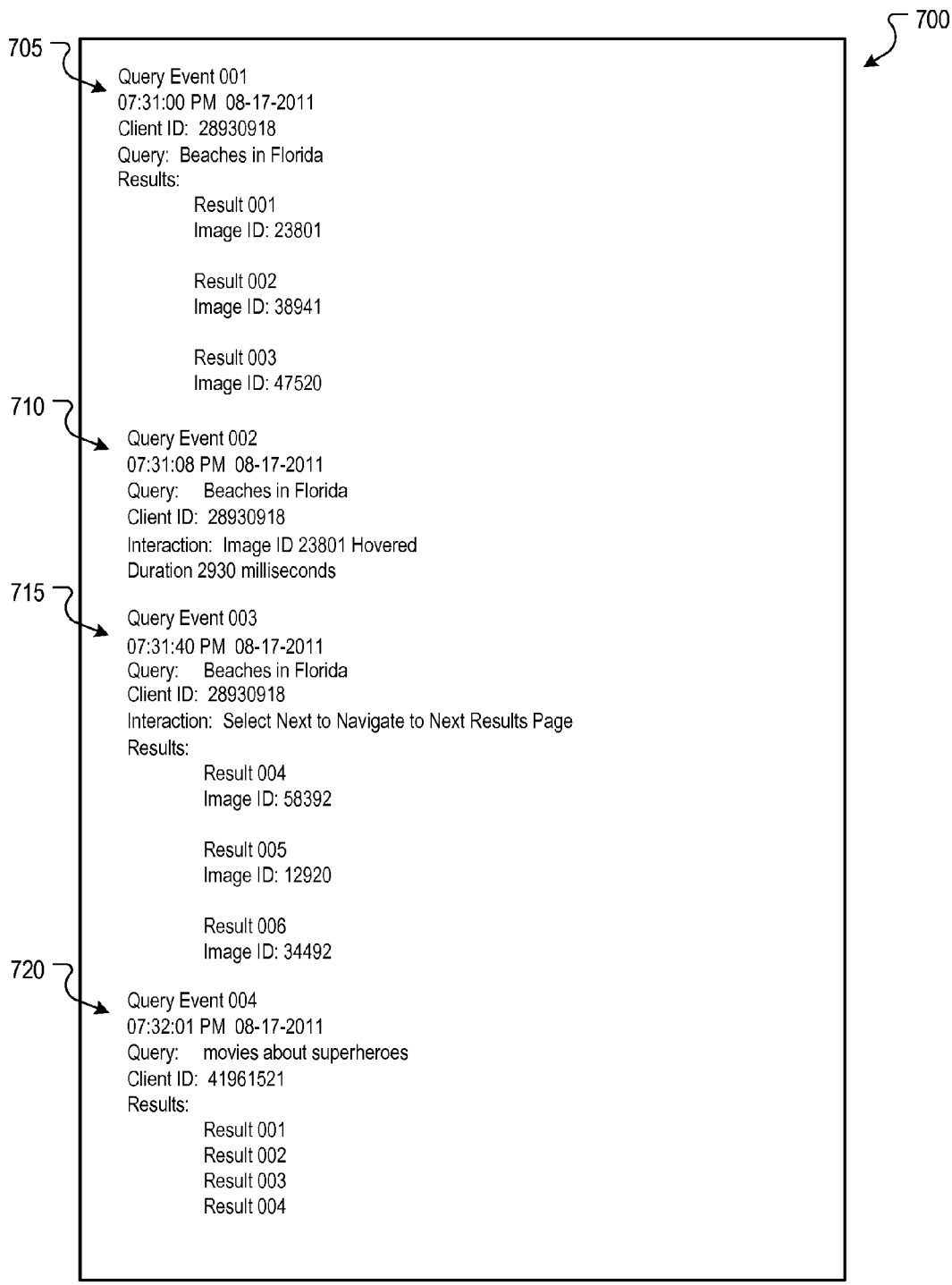
FIG. 7 is an illustration of data included in an example query log.

FIG. 7 is an illustration of data included in an example query log 700. The example query log 700 includes several search event data items 705, 710, 715, and 720. The example search event data item 705 is for a received query "Beaches in Florida" that was received by a search system, such as search system 110 of FIG. 1. The search event data item 705 includes a time stamp specifying that the search query was received on "Aug. 17, 2011" at "07:31:00 PM." The search event data item 705 also includes an identifier ("28930918") and information regarding several image search results provided in response to the search query.

The search event data item 710 is for a hover event. Similar to the search event 705, the search event 710 includes information identifying the search query "Beaches in Florida," a time stamp specifying when the hover occurred, and an identifier. The search event data item 710 also includes information identifying a search result "Image ID 23801" that was hovered over by a pointer element and a time duration value "2930 milliseconds" specifying the duration of the hover.

The search event data item 715 is for a selection of an additional search results page. The search event data item 715 includes information identifying the search query "Beaches in Florida," a time stamp specifying when the interaction was received, and an identifier. The search event data item also includes information identifying the type of interaction "Select Next to Navigate to Next Results Page" and information identifying search results presented on the additional search results page.

The search event data item 720 is for a received query "movies about superheroes." The search event data item 720 includes information identifying the search query "movies about superheroes," a time stamp specifying when the search result was selected, and an identifier ("41961521"). Note that the identifier for the search event data item 720 is different than the identified for the search event data items 705-715. As described above, the query logs 114 can include search event data for multiple identifiers. The search event data item 720 also includes information identifying search results provided responsive to the received search query.

Additional example data that may be logged in search event data items of the query logs 114 are described in more detail in section 4.0 below.

§2.1 Image Search Session Data Objects

There may be many search event data items stored in the query logs 114. To generate image specific information, the query information subsystem 120 processes query logs 114 to generate image search session data objects and stores the image search session data objects in an image search session data object store 116. An image search session data object is an electronic record having information regarding image search events associated with a particular identifier that have occurred during a predefined time period.

Figure 2A:
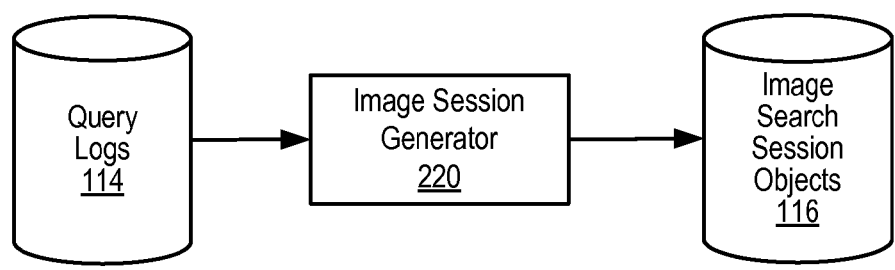
FIG. 2A is a block diagram depicting an example image session generator.

In some implementations, the query information subsystem 120 includes an image session generator that generates the image search session data objects using data stored in the query logs 114. FIG. 2A is a block diagram of depicting an example image session generator 220.

The image session generator 220 can identify a proper subset of the search event data items stored in the data logs 114. For example, the proper subset of search event data items may be the search event data items identified by the image session generator 220 as being associated with a search for images. In some implementations, the proper subset of search event data items excludes search event data items directed to searches for other content other than images. The image session generator 220 can use the information of the proper subset of search event data items to populate the image search session data objects.

The information stored in an image session data object can include any information stored in search event data items of the query logs 114 that is determined to be associated with an image search event and further determined to be associated with the identifier of the image search session data object. For example, this information can include information identifying a received search query 109, information identifying search results 111 provided in response to the received search query 109, information regarding user interactions (e.g., hovers and selections) with search results 111, information regarding user interactions with a user interface the presents the search results 111, and other information, for example as described in section 4.0 below.

The image session generator 220 may receive information specifying the information to include in each image search session data object. The specifying information may be received from an operator of the search system 110 or another human actor. For example, an operator may desire to compile certain information for analysis. The image session generator 220 can process the data in the query logs 114 to identify the specified information and create image search session data objects using the identified information.

Typically, the image session generator 220 generates an image search session data object for one or more predefined time periods. For example, each image search session data object may include information regarding image search events that occurred during a twenty-four hour period, a week, a month, or some other appropriate time period.

In some implementations, an image search session data object includes a time ordered sequence of query data items. Each query data item includes information regarding a particular search query 109 associated with the identifier of the image search session data object. If the query logs 114 include search event data items for multiple search events related to the particular query and occurring during the time period for the image search session data object, the image session generator 220 can aggregate the information into a single query data item. For example, if a search query 109 is received from a user device 106 of the identifier, and one or more search results 111 are selected from search results provided in response to the received search query 109, the query logs 114 may contain a search event data item for the received search query 109 and a search event data item for each selected search result 111. The image session generator 220 can determine that the search event data items are related and aggregate the information (or a portion thereof) of each search event data item into a query data item.

A query data item also can include one or more interaction data items having information regarding user interactions. For example, the image session generator 220 may create an interaction data item for each type of interaction (e.g., hover or selection of a search result) received by at least one search result 109 provided in response to the search query 109 of the query data item. An interaction data item for hover events may include information specifying the search results 111 that were hovered, a hover time duration for each hovered search result 111, a time at which each hover occurred, and presentation position information for each hovered search result 111. An interaction data item for selection events (e.g., click events) may include information specifying the search results 111 that were selected, a selection time duration for each selected search result 111, a time at which each selection occurred, and presentation position information for each selected search result 111.

Figure 8:
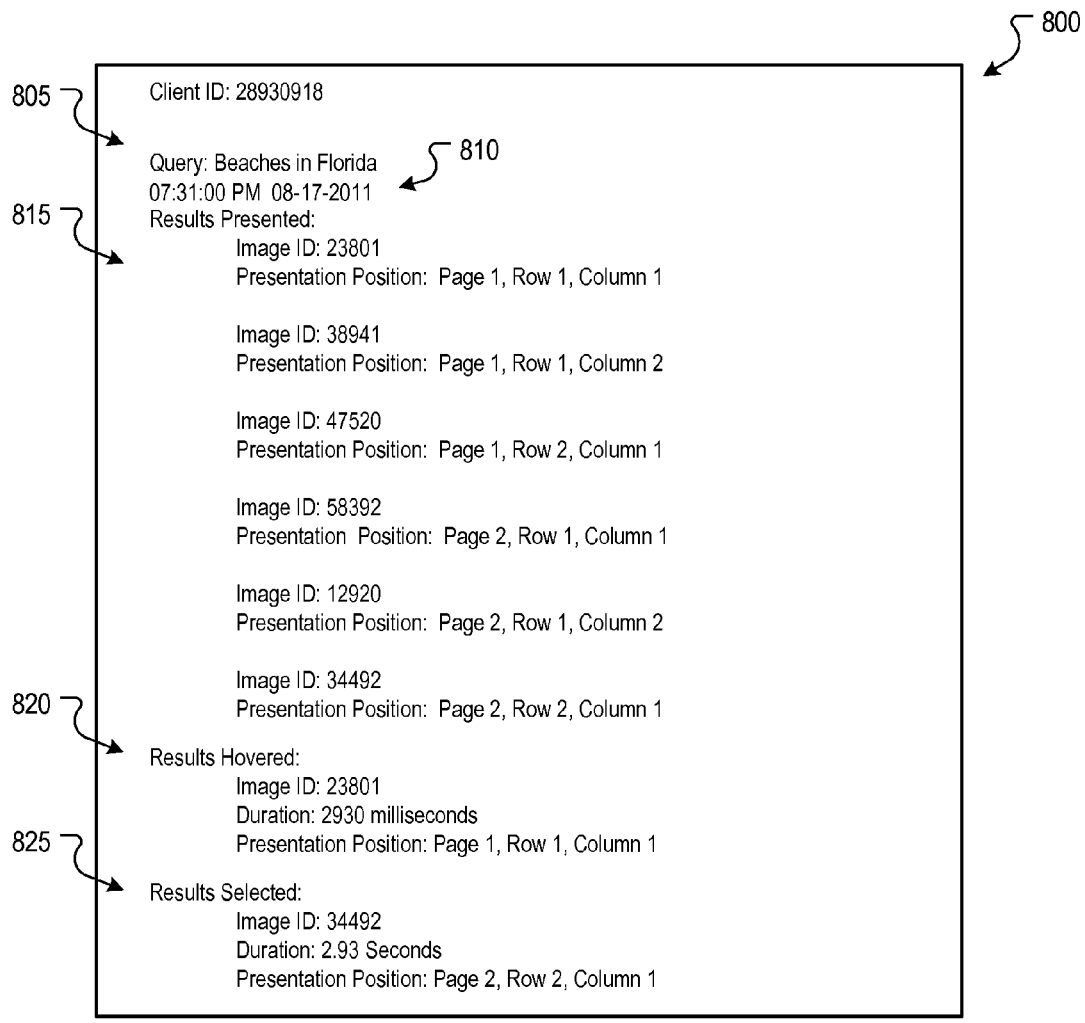
FIG. 8 is an illustration of data included in an example image query session data object.

In one particular implementation, each query data item of an image search session data object includes information identifying the search query 109 for the query data item, a time stamp specifying when the search query 109 was received, information identifying each search result 111 presented to the user, and information identifying each search result 111 for which an interaction occurred. For example, FIG. 8 is an illustration of data included in an example image search session data object 800 for the identifier "2893018" and including information extracted from the example query log 700. In particular, the example image search session object 800 includes a single query data item 805 for the image search query "Beaches in Florida." The example query data item 805 includes general information 810 regarding the image search query, such as the query string and a time stamp specifying the date and time that the image search query was received. Although not shown, the general information 810 can also include information regarding the user interface used to submit the image search query and to view search results, spelling correction information, filter settings, search refinement information, language information, and/or geographic information.

The query data item 805 also includes search result information 815 identifying each search result 111 presented to the user and the presentation position of each presented search result 111. In particular, the search result information 815 identifies the search results 111 presented on the first page of search results and the search results 111 presented on the second page requested by the user.

The query data item 805 also includes interaction data items 820 and 825. The example interaction data item 820 includes information regarding one or more hover events, such as information identifying each search result 111 that was hovered, the hover duration for each hovered search result 111, and the presentation position of each hovered search result 111. The example interaction data item 825 includes information regarding one or more selection events, such as information identifying each selected search result 111, the selection duration of each selected search result 111, and the presentation position of each selected search result 111.

In some implementations, the query information subsystem 120 processes the data for each image search session data object to generate a two dimensional layout of image search results provided for the search query for which the image search session data object is created. For example, a search interface may present the image search results in a row and column form, with multiple image search results included in each row and column. The query information subsystem 120 can recreate how the image search results were presented using the data extracted from the query logs 114 as the data includes data indicating the position at which the image search results were presented.

This position data and layout, along with interaction data, better enables an analysis of the effects of image search result position on the likelihood that an image search result will receive an interaction based on its presentation position. This analysis may be used to normalize the performance of image search results based on their presentation position.

As the time of each search event, including interaction events, can be included in the image search session data objects, the layout and interaction data can be used to determine more clearly how a user interacted with image search results. For example, using hover data for multiple image search results, one may be able to deduct a patch at which a pointer moved across the image search results. Additionally, this data may be used to determine whether an image search result received a hover in response to the image search result being initially presented under a pointer, rather than because a user moved a pointer to the image search result.

§2.2 Image Query Model

As described above, the search system 110 processes the image search session data objects for multiple identifiers to generate one or more image query models. In general, an image query model includes data regarding image search events aggregated over multiple users.

Figure 2B:
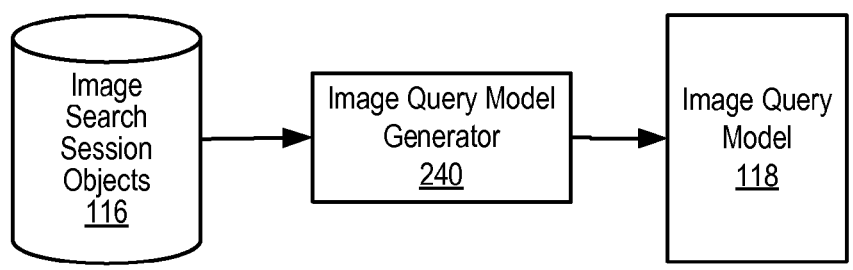
FIG. 2B is a block diagram depicting an example image query model generator.

FIG. 2B is a block diagram depicting an example image query model generator 240. The image query model generator 240 processes the image search session models 116 to create one or more image query models 118. In some implementations, the image query model 118 is a quasi-two dimensional model having information regarding received search queries 109 and image search results provided in response to the search queries 109, and the respective locations of the image search results in row and column format, where multiple rows and columns were provided. In some implementations, the query model generator 240 processes image search session data objects 116 for a multitude of identifiers to create the image query model 118.

An example quasi-two dimensional model for a particular query includes a two dimensional data structure having rows and columns. The intersection of each row and column includes an image search result position in which at least one search result 111 has been presented. The image query model can include, for each search result position, data specifying each search result 111 that has been presented in that position. For each search result 111 that has been presented in that position, the image query model can include an impression count specifying the number of times the search result 111 has been presented in that position for the particular query, a click count specifying the number of times the search result 111 has been selected when presented in that position for the particular search query and/or a hover count specifying the number of times the search result 111 has been hovered when presented in that position for the particular search query.

Another example image query model includes a two dimensional data structure, such as a table having cells arranged in rows and columns. Each row may be for a particular search query 109 and each column may be for a particular search result 111. Each cell may include an interaction value for the search query 109 of the cell and the search result 111 of the cell. In some implementations, the interaction value includes the number of times the search result 111 of the cell was selected when the search result 111 was presented with search results 111 for the search query 109. In some implementations, the interaction value includes the sum of the selections and the hovers for the search query 109 and the search result 111.

Another example image query model 118 may include information identifying, for each received search query 109, information identifying each search result 111 provided in response to the search query 109, an impression count for each search result 111 for the search query 109 specifying the number of times the search result 111 was presented to a user in response to the search query 109, information identifying each search result 111 that received an interaction (e.g., hover or selection), and an interaction count specifying the number of times the search result 111 received an interaction when presented as a search results 111 responsive to the query 109.

In some implementations, the interaction count includes a sum of hover counts and selection counts for the search result 111. In some implementations the image query model 118 includes both the hover count and the selection count for the search result 111.

The image query model generator 240 can determine the impression counts, hover counts, and selection counts by aggregating the information for each search query 109 included in the image search session data objects. For example, to determine a hover count, the image query model generator 240 can identify each unique search query of the image search session data objects. The image query model generator 240 can also identify, for each identified unique search query, the number of times that a search result was hovered when provided in response to the unique search query.

Figure 9:
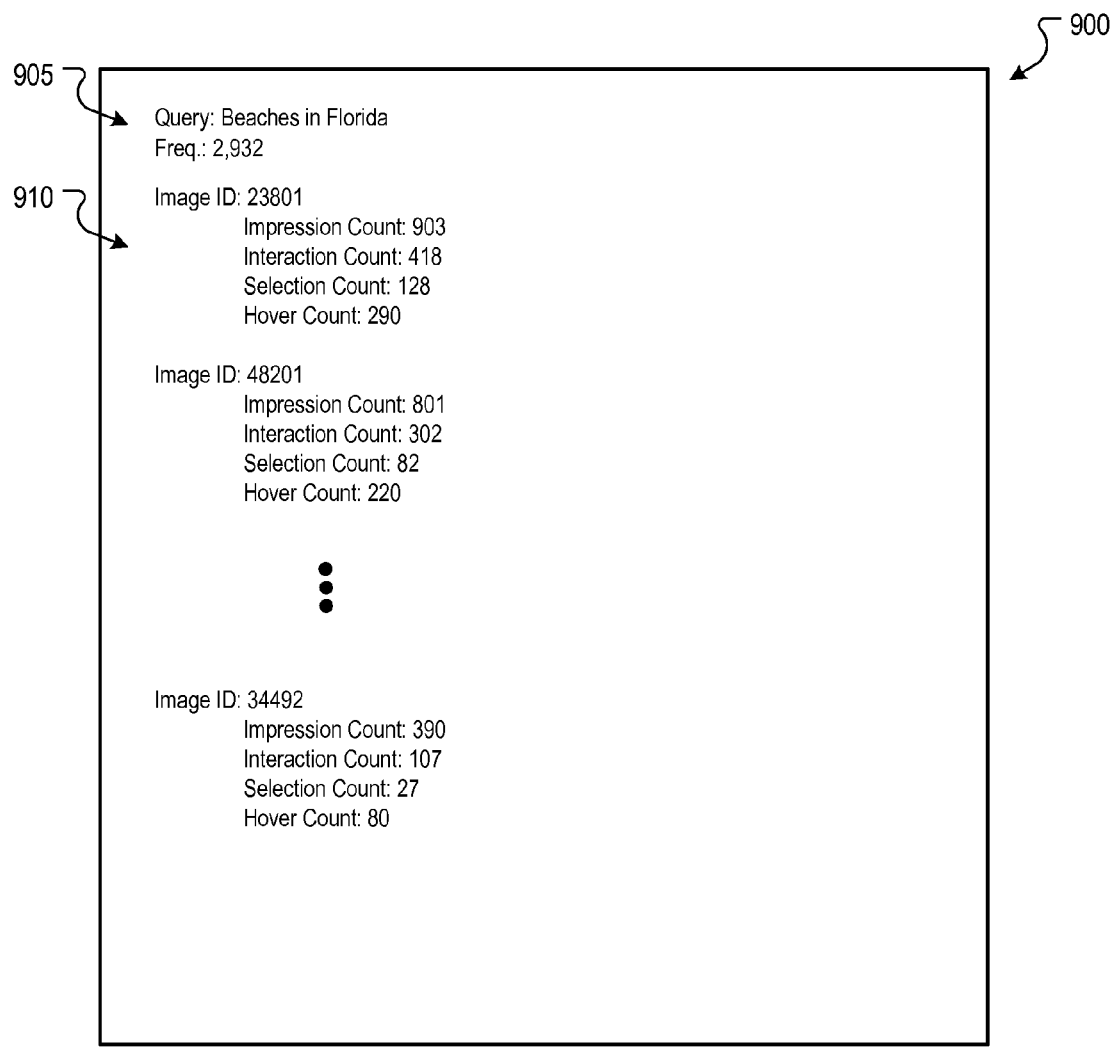
FIG. 9 is an illustration of data included in an example image query model. Like reference numbers and designations in the various drawings indicate like elements.

FIG. 9 is an illustration of data included in an example query model 900. The example query model 900 includes general information 905 regarding each received search query 109, such as a query string, and a frequency value specifying the number of times the search query 109 was received. The query model 900 also includes, for each received search query 109, search result information 910. The search result information 910 includes information regarding each search result 111 presented in response to the search query 109. For example, this information may include information identifying the search result 111, an impression count, a selection count, and a hover count.

The image query model 118 can be used, in part, to rank images with regards to particular search queries 109. For example, a search ranking system may determine that images that receive a large number of selections and hovers for a particular search query 109 should be ranked higher than images that receive fewer selections and hovers.

In some implementations, the image model generator 240 evaluates information included in interaction data items to determine whether to include the interactions in the interactions counts of the image query model 118. For example, the image model generator 240 may determine not to include short hovers (e.g., having a duration less than one second) or short clicks (e.g., having a duration less than ten seconds). These short durations may indicate that the image was not responsive to the search query 109.

§3.0 Query Information Processes

Figure 3:
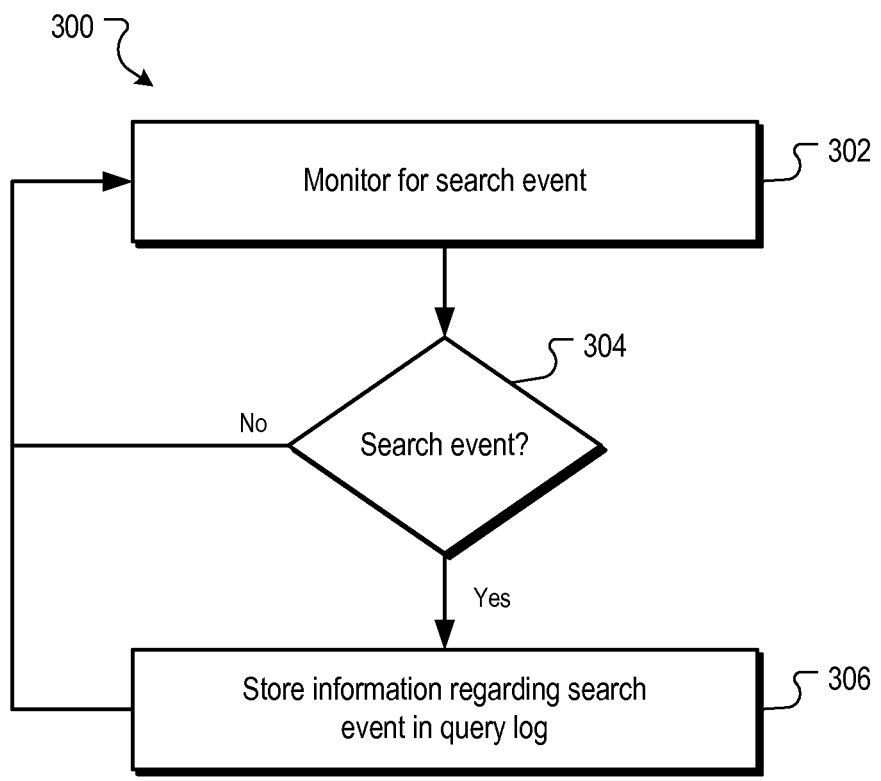
FIG. 3 is a flow chart of an example process for storing search event information in query logs.

FIG. 3 is a flow chart of an example process 300 for storing query information in a query log. The process 300 can, for example, be implemented in the query information subsystem 120 of FIG. 1.

The process monitors for a search event (302). For example, the search system 110 can monitor for a search query 109 received from a user device 106. The search system 110 can also monitor for information regarding a user interaction with a search result 111 provided, for example by the search system 110.

When a search query 109 or information regarding a user interaction is received by the search system 110, additional information regarding the search events is typically also received. For example, the search system 110 may receive, along with a search query 109, an identifier associated with the search query 109, information regarding a user interface that facilitated sending the search query 109, and other information associated with the search query 109 discussed above.

If a search event is detected (304), then information regarding the search event is stored (306). For example, if the search system 110 receives information regarding a search event, the search system 110 can provide the information to the query information subsystem 120. The query information subsystem 120 can create search event data item for the search event in the query logs 114. The search event data item can include all or a portion of the information regarding the search event, as discussed above.

For search events that cause the search system 110 to provide search results to a user device 106, the query information subsystem 120 can store information identifying the provided search results 111 with the search event data item for those search events. For example, in response to providing search results to a user device 106, the search system 110 may provide information regarding the provided search results 111 to the query information subsystem 120. In some implementations, the operation of providing search results 111 may cause the query information subsystem 120 to store a search event data item for that operation.

If a search event is not detected, then the process 300 continues to monitor for a search event.

Figure 4:
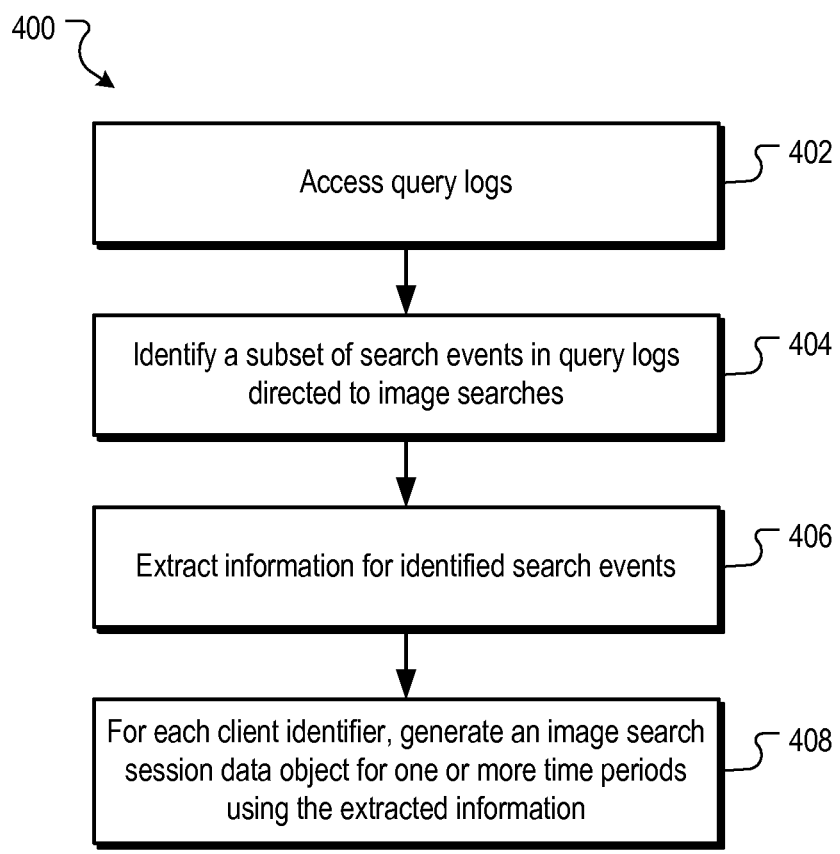
FIG. 4 is a flow chart of an example process for generating image search session data objects using information stored in query logs.

FIG. 4 is a flow chart of an example process 400 for generating image query session data objects using information stored in query logs 114. The process 400 can, for example, be implemented in the query information subsystem 120 of FIG. 1.

The process 400 accesses one or more query logs 114 (402). The query logs 114 can store search event information for each of a multitude of identifiers, for example in the form of search event data items.

The process 400 identifies a proper subset of search event data items in the query logs 114. The proper subset of search event data items can include search event data items for search events directed to image searches (404). For example, each search event data item in the query logs 114 may include information identifying a type of search (e.g., image, general content, video, etc.) associated with the search event data item. The query information subsystem 120 can process each search event data item to determine the type of search and include search event data items for image searches in the proper subset.

The process 400 extracts information from proper subset of search event data items and groups the extracted information by user identifier (406). For example, the query information subsystem 120 may extract each search event data item of the proper subset of search event data items. The query information subsystem 120 can also identify an identifier associated with each extracted search event data item and group the extracted search event data items by user identifier. These identified identifiers define a proper subset of identifiers for which image search session data items may be created.

The process 400 generates one or more image search session data objects for each identifier using the extracted and organized search event data items for the identifiers (408). For example, the query information subsystem 120 may generate the image search session data items. As discussed above, in some implementations, an image search session data object is a time ordered sequence of query data items for an identifier that occurred within a specific time period. Each query data item of an image search session data object includes search event information related to a particular search query.

Figure 5:
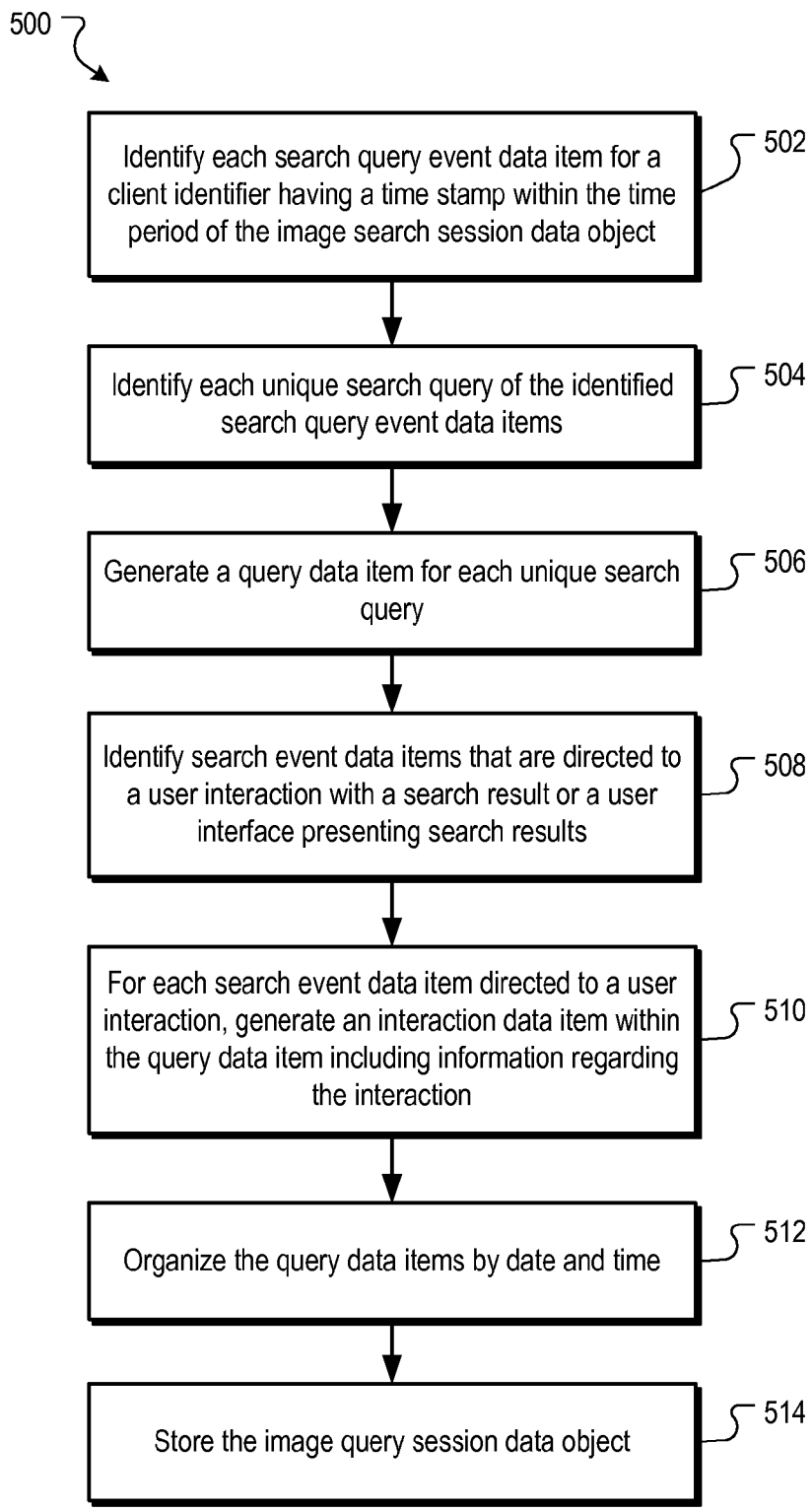
FIG. 5 is a flow chart of an example process for generating an image search session data object for an individual user identifier and for a predefined time period.

FIG. 5 is a flow chart of an example process 500 for generating an image query session data object for an identifier and for a predefined time period. The process 500 can, for example, be implemented in the query information subsystem 120 of FIG. 1.

The process 500 identifies search event data items for an identifier and that has a time stamp specifying a date and time of occurrence within the time period for the image search session data object (502). For example, the query information subsystem 120 can compare the date and time of each search event data item to the time period of the image search session item to determine whether the date and time is within the time period.

The process 500 identifies each unique search query 109 of the identified search event data items (504). For example, the query information subsystem 120 can identify and generate a list of each unique search query 109 of the identified search event data items.

The process 500 generates a query data item within the image search session data objects for each unique search query 109 (506). For example, the query information subsystem 120 may create a query data item for each unique search query 109 and populate the query data item with information from each search event data item associated with the unique search query 109. This information can include substantially all of the information included with the appropriate search event data items or a portion thereof. For example, an operator of the search system 110 may specify what information to include in each query data object. This information may include, for example, information identifying each search result 111 provided or presented to a user in response to the search query 109, and/or a presentation position of each presented search result 111.

The process 500 identifies any search event data items that are directed to a user interaction with a search result (e.g., a hover event or selection event) or a user interface presenting search results (508). For example, the query information subsystem 120 can evaluate each search event data item to identify the type of search event of the search event data item.

The process 500 generates, for each search event data item directed to a user interaction, an interaction data item within the appropriate query data item (510). For example, in some implementations, the query information subsystem 120 can create an interaction data item for each search event item directed to a user interaction. In some implementations, the query information subsystem 120 can create an interaction data item for each type of user interaction. For example, if search event data items indicate that one or more search results 111 were selected in response to a search query, the query information subsystem 120 may create an interaction data item having information regarding each of the one or more selected search results 111.

The process 500 organizes the query data items by date and time within the image search session data object (512). For example, the query information subsystem 120 can organize the query data items based on the time and date at which the search query 109 of the query data item was received.

The process 500 stores the image search session data object (514). For example, the query information subsystem 120 can store the image search session data object in the image search session data object store 116 of FIG. 1.

Figure 6:
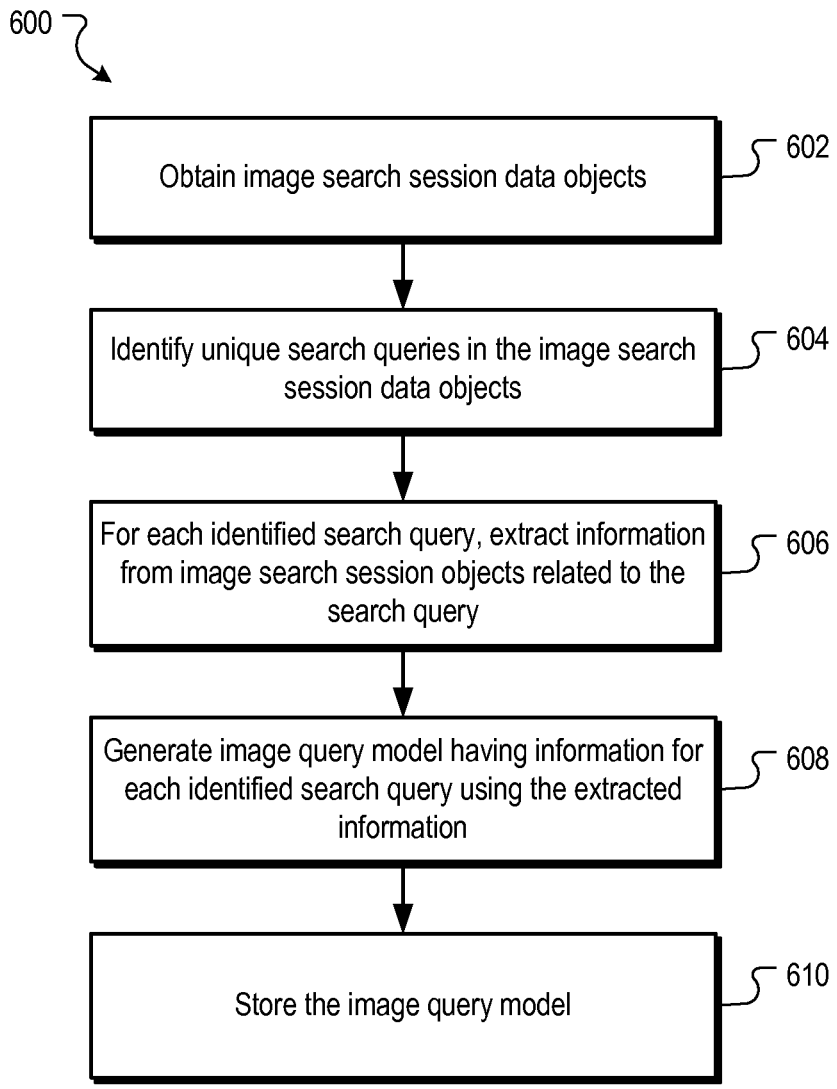
FIG. 6 is a flow chart of an example process for generating an image query model.

FIG. 6 is a flow chart of an example process 600 for generating an image query model 118. The process 600 can, for example, be implemented in the query information subsystem 120 of FIG. 1.

The process 600 obtains image search session data objects (602). For example, the query information subsystem 120 may access the query image search session data objects store 116 to obtain the image search session data objects.

The process 600 identifies each unique search query 109 included in the image search session data objects (602). For example, the query information subsystem 120 may access each image search session data object and extract the search queries 109 included in each image search session data object. The query information subsystem 120 may build a list of the extracted search queries 109 and remove any duplicates from the list.

The process 600 extracts, for each unique search query 109, information associated with the unique search query 109 from the image search session data objects (606). For example, the query information subsystem 120 may search each image search session data object for the unique search query 109 and if a query data item is found within an image search session data object for the unique query 109, extract some or all of the information included in that query data item.

The process 600 generates the image query model 118 using the extracted information. For example, the query information subsystem 120 may aggregate the extracts information for each unique search query and generate the image query model 118 using the aggregated information.

In some implementations, an image query model 118 includes interaction event information for each unique search query 109. In such implementations, the image query model 118 combines interaction counts for each unique query across all or a portion of the image search session objects. For example, if several image search session data objects include information identifying search results 111 that were hovered when provided in response to one of the unique queries, the image search subsystem 120 may identify, using the information stored in the image search session data objects, each hovered search result 111 and a total hover count for each hovered search result 111 with respect to the unique search query 109. A similar process can be performed to derive a total selection count for each search result 111 selected when provided in response to the unique search query 109. These counts can be included in the image query model 118 as discussed above.

The process 600 stores the image query model 118. For example, the query information subsystem 118 may store the image query model 118 in a data store.

§4.0 Search Events

For each search event handled by the search system 110, the query information subsystem 120 creates a search event data item in the query logs 114. The search event data item for a search event typically includes an identifier that identifies the user, user device 106, or user interface that submitted the search query 111 associated with the search event, a time stamp that specifies a time and date at which the search event occurred, and information describing the search event.

The search system may receive, along with a search query and actions taken in response to receiving search results, information identifying the user or user device that submitted the search query. In some implementations, the identity of the user or user device is anonymized.

The information describing a search event can include various information related to the search event, and may vary based on the type of search event. For example, the information describing a received search query 109 typically includes the query itself and information regarding search results 111 provided in response to the received search query 109. The information describing an interaction typically includes details of the interaction, such as information identifying the type of interaction and a time duration value specifying a time duration of the interaction.

The information regarding the search results 111 may include information identifying the search results 111, a performance score (e.g., a relevance score) or ranking of each search result, a presentation position of each search result 111, and other information related to each search result 111. The presentation position of a search result 111 can include information identifying the position of the search result 111 within a user interface or viewport presenting the search results 111.

Image search results are typically organized for presentation in one or more rows and one or more columns, and amongst multiple pages of search results 111, according to a ranking of the images with respect to a search query 109. The presentation position of an image search result may include information identifying the page number, row number, and column number at which the image search result is presented. The number of images presented in each row and in each column may vary based on the size of the user interface presenting the image search results. Such information may also be included in the search event data.

The information regarding the search results 111 may also include, for each provided search result 111, information specifying whether the search result 111 was presented to the user. For example, a search result 111 having too low of a ranking to be provided on the first search results page may not be presented if the user does not request the search results page on which the search result 111 would be presented. In another example, some search results (e.g., lower ranked search results) may be designated for presentation on a lower row of the first page, commonly referred to as being "below the fold." If the user interface presenting the search results page does not present that row, then the search system 110 will specify that the search results 111 on that row were not presented to the user, unless the search events indicate that the browser scrolled down to include other rows that were initially below the fold.

A search event data item may also include information identifying a type of search associated with the search event. For example, the search system 110 may be capable of facilitating search operations for general content, images, videos, news articles, maps, products, restaurants, or other types of content. A user may be provided the option of selecting from the types of searches.

A search event data item may include information regarding a user interface used to submit a search query 109 and to consume search results 111. For example, a user may use one of a multitude of web browsers to request search operations, and the particular browser used may be identified by an agent type.

A search event data item may include information regarding search refinements and whether the spelling of the query was corrected. For example, the search system 110 may provide links to search queries that are related to a received search query 109. A search event data item for a received search query 109 may include information identifying the provided search refinements, information identifying any selected search refinements, and information identifying whether the search query 109 of the search event data item is a refinement query.

A search event data item may include information regarding the geographic location of the user device 106 from which the search query 109 was received. For example, the user device 106 may include a GPS device that provides the location information.

As discussed above, search event data items for user interaction events include information describing the interaction. One such user interaction includes a pointer element hovering over a search result 111. A search event data item for a hovering event may include information identifying the hovered search result, a presentation position of the hovered search result 111, and a time duration value specifying an amount of time the pointing element hovered over the search result 111. In some implementations, the time duration value for a hover event has a resolution of milliseconds. For example, a hover time duration value may be measured in milliseconds.

In some implementations, if multiple search results 111 are hovered in response to a particular search query 109, then the query information subsystem 120 may create a single search event data item that includes information identifying each hovered search result, a presentation location for each hovered search result 111, and an order in which the search results 111 were hovered.

A search event data item for a hover or for other types of search events may include information regarding a location of a pointer element, for example at the time that search results 111 are initially presented. By having this information, a search ranking system may discount hovers occurring in response to this initial location of the pointer element as the user likely did not intend to hover over the search result 111. Alternatively, data indicating the discount of the hover may be stored in image search session data objects, as described in more detail below.

Another user interaction includes a selection of a search result 111. A search event data item for a selection event may include information identifying the selected search results, a presentation location of the selected search result 111, and a time duration value specifying an amount of time the user dwells on a landing page (i.e., the document to which the search result links) of the search result 111. Landing pages often include links to other web pages.

A search event data item for such a request may include information describing the request for additional search results, for example information identifying the requested page, and information identifying the search results 111 presented by the requested search results page.

Yet another user interaction includes a resizing of a user interface, such as a web browser window, presenting search results 111. For example, many web browser windows can be resized vertically and horizontally via a user dragging a corner of the web browser window. A search event data item for a resizing event may include information specifying the original window size, the updated window size, information identifying search results presented by the resized window and/or a presentation position (e.g., row and column position) for each search result 111 presented by the resized window.

The above list of search events and corresponding search event data is not exhaustive, and additional search event data can also be stored.

§5.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    identifying search event data items for a plurality of identifiers, each search event data item including:
        information regarding a search event;
        a time stamp specifying a time and date at which the search event occurred; and
        an identifier associated with the search event;
    identifying a proper subset of the search event data items, the proper subset of search event data items being search event data items for search events related to an image search, wherein each search event comprises at least one of receipt of a search query, distribution of search results in response to a search query, receipt of information identifying an interaction with a search result provided in response to a search query, and receipt of information identifying an interaction with a web browser window presenting search result provided in response to a search query;
    identifying a proper subset of the plurality of identifiers, the proper subset of identifiers being identifiers associated with at least one search event data item for a search event related to an image search;
    generating, for each identifier of the proper subset of identifiers, at least one image search session data object using the proper subset of search event data items, each image search session data object being for a particular time period and including information regarding image search events derived from the proper subset of search event data items that include the identifier and that occurred during the time period; and
    generating an image query model using the at least one image search session data object for each identifier, the image query model specifying:
        images that received an interaction during an image search session for at least one of the identifiers; and
        for each image that received an interaction, a two dimensional display position of the image on an image search result page when the image received the interaction.

2. The method of claim 1, wherein the information identifying an interaction with a search result provided in response to a search query comprises one of information identifying a selection of a search result and information identifying a hover over a search result by a pointer element, the information identifying the interaction with the search result further comprising a time duration value specifying a time duration of the interaction.

3. The method of claim 1, wherein each image search session data object for an identifier comprises a time ordered list of query data item, each query data item being for a particular search query received from a device associated with the identifier and including information identifying the received search query and information identifying search results provided in the response to the received search query.

4. The method of claim 3, wherein generating an image search session data object for an identifier comprises:
identifying each search event data item of the proper subset of search event data items that is associated with the identifier and further associated with an particular search query;
extracting information from each identified search event data item; and
generating a query data item for the particular search query using the extracted information.

5. The method of claim 4, wherein generating an image search session data object for an identifier further comprises:
determining whether an identified search event data item comprises information identifying an interaction with a search result provided in response to receiving the particular search query; and
creating an interaction data item as part of the query data item, the interaction data item identifying the search result receiving the interaction.

6. The method of claim 5, wherein the interaction data item further comprises information identifying a type of interaction, the type of interaction being one of a selection of the search result and a hover of a pointer element over the search result.

7. The method of claim 6, wherein the interaction data item further comprises a location within a viewport of the search result receiving the interaction.

8. The method of claim 6, wherein the interaction data item further comprises a time stamp specifying a time and date at which the interaction began.

9. The method of claim 3, wherein each query data item further comprises information identifying a viewport location for each provided search result, the viewport location defining a presentation location of the search result within a viewport.

10. The method of claim 3, wherein each query data item further comprises a location value for each provided search result, the location value specifying a page number, column number, and row number for which the provided search result is presented.

11. The method of claim 3, wherein each query data item further comprises, for each search result provided in response to the search query of the query data item, information specifying whether the search result was presented to a user.

12. The method of claim 11, wherein the information specifying whether a search result was presented to a user is determined based on a viewport location for the search result and whether that viewport location was presented to the user.

13. The method of claim 3, wherein each query data item comprises location information specifying a location of a pointer element when the search results were initially provided in response to the query.

14. The method of claim 3, further comprising:
identifying, using image search session data objects for the plurality of identifiers, each unique search query represented in the image search session data objects;
identifying, for each unique query, each query data item associated with the unique query; and
generating a query record for each identified search query, the query record comprising information extracted from each query data item associated with the identified search query.

15. The method of claim 1, wherein the image query model further specifies, for each image that received an interaction, a number of interactions received at each display position in which the image received an interaction, the interaction comprising one of a selection and a hover.

16. A non-transitory computer storage medium encoded with a computer program, the program comprising instructions that when executed by data processing apparatus cause the data processing apparatus to perform operations comprising:
identifying search event data items for a plurality of identifiers, each search event data item including:
information regarding a search event;
a time stamp specifying a time and date at which the search event occurred; and
an identifier associated with the search event;
identifying a proper subset of the search event data items, the proper subset of search event data items being search event data items for search events related to an image search, wherein each search event comprises at least one of receipt of a search query, distribution of search results in response to a search query, receipt of information identifying an interaction with a search result provided in response to a search query, and receipt of information identifying an interaction with a web browser window presenting search result provided in response to a search query;
identifying a proper subset of the plurality of identifiers, the proper subset of identifiers being identifiers associated with at least one search event data item for a search event related to an image search;
generating, for each identifier of the proper subset of identifiers, at least one image search session data object using the proper subset of search event data items, each image search session data object being for a particular time period and including information regarding image search events derived from the proper subset of search event data items that include the identifier and that occurred during the time period; and
generating an image query model using the at least one image search session data object for each identifier, the image query model specifying:
images that received an interaction during an image search session for at least one of the identifiers; and
for each image that received an interaction, a two dimensional display position of the image on an image search result page when the image received the interaction.

17. The non-transitory computer storage medium of claim 16, wherein each image search session data object for an identifier comprises a time ordered list of query data item, each query data item being for a particular search query received from a device associated with the identifier and including information identifying the received search query and information identifying search results provided in the response to the received search query.

18. The non-transitory computer storage medium of claim 17, wherein generating an image search session data object for an identifier comprises:
identifying each search event data item of the proper subset of search event data items that is associated with the identifier and further associated with an particular search query;

extracting information from each identified search event data item; and generating a query data item for the particular search query using the extracted information.

19. The non-transitory computer storage medium of claim 18, wherein the operations of generating an image search session data object for an identifier further comprises:

determining whether an identified search event data item comprises information identifying an interaction with a search result provided in response to receiving the particular search query; and creating an interaction data item as part of the query data item, the interaction data item identifying the search result receiving the interaction.

20. The non-transitory computer storage medium of claim 19, wherein the interaction data item further comprises information identifying a type of interaction, the type of interaction being one of a selection of the search result and a hover of a pointer element over the search result.

21. The non-transitory computer storage medium of claim 20, wherein the interaction data item further comprises a location within a viewport of the search result receiving the interaction.

22. The non-transitory computer storage medium of claim 20, wherein the interaction data item further comprises a time stamp specifying a time and date at which the interaction began.

23. The non-transitory computer storage medium of claim 17, wherein each query data item further comprises information identifying a viewport location for each provided search result, the viewport location defining a presentation location of the search result within a viewport.

24. The non-transitory computer storage medium of claim 17, wherein each query data item further comprises a location value for each provided search result, the location value specifying a page number, column number, and row number for which the provided search result is presented.

25. The non-transitory computer storage medium of claim 17, wherein each query data item further comprises, for each search result provided in response to the search query of the query data item, information specifying whether the search result was presented to a user.

26. The non-transitory computer storage medium of claim 25, wherein the information specifying whether a search result was presented to a user is determined based on a viewport location for the search result and whether that viewport location was presented to the user.

27. A system, comprising:

a data store storing a query log that stores search event data items for a plurality of identifiers, each search event data item including:

information regarding a search event;

a time stamp specifying a time and date at which the search event occurred; and an identifier associated with the search event;

one or more computers configured to interact with the data store, the one or more computers being further configured to perform operations comprising:

identifying a proper subset of the search event data items, the proper subset of search event data items being search event data items for search events related to an image search, wherein each search event comprises at least one of receipt of a search query, distribution of search results in response to a search query, receipt of information identifying an interaction with a search result provided in response to a search query, and receipt of information identifying an interaction with a web browser window presenting search result provided in response to a search query;

identifying a proper subset of the plurality of identifiers, the proper subset of identifiers being identifiers associated with at least one search event data item for a search event related to an image search;

generating, for each identifier of the proper subset of identifiers, at least one image search session data object using the proper subset of search event data items, each image search session data object being for a particular time period and including information regarding image search events derived from the proper subset of search event data items that include the identifier and that occurred during the time period; and generating an image query model using the at least one image search session data object for each identifier, the image query model specifying:

images that received an interaction during an image search session for at least one of the identifiers; and for each image that received an interaction, a two dimensional display position of the image on an image search result page when the image received the interaction.

* * * * *